United States Patent
Pitz et al.

(10) Patent No.: US 12,530,010 B2
(45) Date of Patent: Jan. 20, 2026

(54) COMPENSATION OF TOOL DEFLECTION BY DYNAMICALLY ADJUSTING THE TOOL GEOMETRY

(71) Applicant: Siemens Aktiengesellschaft, Munich (DE)

(72) Inventors: Thomas Pitz, Rutesheim (DE); Ralf Spielmann, Stuttgart (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 18/868,582

(22) PCT Filed: Apr. 28, 2023

(86) PCT No.: PCT/EP2023/061199
§ 371 (c)(1),
(2) Date: Nov. 22, 2024

(87) PCT Pub. No.: WO2023/241846
PCT Pub. Date: Dec. 21, 2023

(65) Prior Publication Data
US 2025/0172922 A1 May 29, 2025

(30) Foreign Application Priority Data
Jun. 14, 2022 (EP) .................................. 22178956

(51) Int. Cl.
*G05B 19/404* (2006.01)
*G05B 19/416* (2006.01)

(52) U.S. Cl.
CPC ....... *G05B 19/404* (2013.01); *G05B 19/4163* (2013.01); *G05B 2219/49079* (2013.01)

(58) Field of Classification Search
CPC .............. G05B 19/404; G05B 19/4163; G05B 2219/49079; G05B 2219/49087; G05B 2219/49099
See application file for complete search history.

(56) References Cited

U.S. PATENT DOCUMENTS

| | | | |
|---|---|---|---|
| 5,255,199 A | 10/1993 | Barkman et al. | |
| 2008/0105094 A1* | 5/2008 | McMurtry | B23Q 17/0966 82/1.11 |

(Continued)

FOREIGN PATENT DOCUMENTS

| | | |
|---|---|---|
| DE | 100 44 306 A1 | 4/2002 |
| DE | 10 2017 206 931 A1 | 10/2016 |

(Continued)

OTHER PUBLICATIONS

PCT International Search Report and Written Opinion of International Searching Authority mailed 26.07.2023 corresponding to PCT International Application No. PCT/EP2023/061199 filed Apr. 28, 2023.

*Primary Examiner* — Hien D Khuu
*Assistant Examiner* — Mohammed Shafayet
(74) *Attorney, Agent, or Firm* — Henry M. Feiereisen LLC (57) ABSTRACT

A machine tool numerical controller receives a parts program which determines a path along which a workpiece should be machined in a material-removing manner by a machining tool. The numerical controller determines control commands by utilising the parts program and controls the position-controlled axes according to the determined control commands. The numerical controller determines the control commands such that the workpiece is machined in a material-removing manner by the machining tool along the path determined by the parts program. During the machining of the workpiece, the numerical controller receives, in real (Continued)

time, actual values characteristic of a machining force exerted on the machining tool and takes a geometrical measurement of the machining tool and the machining force into consideration in the determining of the control commands. During the machining process, the geometrical measurement is varied dynamically and in real time according to the machining force.

8 Claims, 4 Drawing Sheets

(56) References Cited

U.S. PATENT DOCUMENTS

| | | | | |
|---|---|---|---|---|
| 2011/0218668 A1* | 9/2011 | Morfino | G05B 19/401 | 700/174 |
| 2015/0127139 A1* | 5/2015 | Bolin | G05B 19/4065 | 700/173 |
| 2015/0134101 A1* | 5/2015 | Iuchi | G05B 19/4086 | 700/160 |
| 2017/0014963 A1* | 1/2017 | Tsuchimochi | B23Q 15/12 | |
| 2018/0150060 A1* | 5/2018 | Hsu | G05B 19/40937 | |
| 2018/0307200 A1* | 10/2018 | Boye | G05B 19/404 | |
| 2019/0143467 A1* | 5/2019 | Wang | G05B 19/4065 | 700/175 |
| 2021/0173375 A1* | 6/2021 | Sawaoka | G05B 19/404 | |
| 2023/0211500 A1* | 7/2023 | Satou | B25J 11/006 | 700/193 |

FOREIGN PATENT DOCUMENTS

| | | |
|---|---|---|
| EP | 2 871 547 A1 | 5/2015 |
| EP | 3 708 297 A1 | 9/2020 |

* cited by examiner

Machining force $F$

FIG 8

Geometric measurement

COMPENSATION OF TOOL DEFLECTION BY DYNAMICALLY ADJUSTING THE TOOL GEOMETRY

CROSS-REFERENCES TO RELATED APPLICATIONS

This application is the U.S. National Stage of International Application No. PCT/EP2023/061199, filed Apr. 28, 2023, which designated the United States and has been published as International Publication No. WO 2023/241846 A1 and which claims the priority of European Patent Application, Serial No. 22178956.3, filed Jun. 14, 2022, pursuant to 35 U.S.C. 119(a)-(d).

BACKGROUND OF THE INVENTION

The present invention is based on an operating method for a machine tool,
  wherein a numerical controller of the machine tool receives a parts program which determines a path along which a workpiece should be machined in a material-removing manner by means of a machining tool of the machine tool,
  wherein for a number of position-controlled axes of the machine tool, by means of which the machining tool is moved in a position-controlled manner relative to the workpiece, the numerical controller determines control commands by utilizing the parts program and controls the position-controlled axes according to the determined control commands,
  wherein the numerical controller determines the control commands in such a way that the workpiece is machined in a material-removing manner by the machining tool along the path determined by the parts program,
  wherein during the machining of the workpiece by the machining tool, the numerical controller receives, in real time, a number of actual values that are characteristic of a machining force exerted by the workpiece on the machining tool during the machining of the workpiece by the machining tool,
  wherein the numerical controller takes a geometric measurement of the machining tool and the machining force into consideration when determining the control commands.

The present invention is further based on a control program for a numerical controller, wherein the control program comprises machine code, the processing of which by the numerical controller causes the numerical controller to execute such an operating method.

The present invention is further based on a numerical controller which is programmed with such a control program, so that in operation it executes such an operating method.

The present invention is further based on a machine tool,
  wherein the machine tool has a numerical controller, from which a parts program can be received which determines a path along which a workpiece is to be machined in a material-removing manner,
  wherein the machine tool has a number of position-controlled axes, by means of which a machining tool of the machine tool can be moved in a position-controlled manner relative to the workpiece,
  wherein the numerical controller is connected to the position-controlled axes for the specification of control commands to the position-controlled axes,
  wherein the machine tool has a device, by which during the machining of the workpiece a number of actual values that are characteristic of a machining force acting on the machining tool during the machining of the workpiece can be captured or determined,
  wherein the numerical controller is connected to the device for receiving the actual values.

Such an operating method, the corresponding numerical controller, the associated machine tool and thus in effect also the control program are known for example from DE 10 2017 206 931 A1 or the corresponding US 2018/0 307 200 A1.

Similar matters are covered by EP 2 871 547 A1 and US 2008/0 105 094 A1.

In DE 10 2017 206 931 A1 a test workpiece with a known geometry is first machined synchronously in a learning cut by means of a milling cutter (machining tool from DE 10 2017 206 931 A1). As part of the learning cut, a relationship is determined between the torque of a spindle drive for the milling cutter, which is substantially proportional to the machining force, and a deflection of the milling cutter caused thereby. This relationship is stored in the numerical controller and as a result can be taken into consideration synchronously during the machining of subsequent workpieces.

In DE 10 2017 206 931 A1 the relationship between the torque and the deflection is determined in the form of axis rigidities. This determination is performed individually for each axis. This is taken into consideration in that the position setpoint values for the axes are corrected as a function of the respective axis rigidity and the deflection force that occurs (machining force from DE 10 2017 206 931 A1).

The teaching of DE 10 2017 206 931 A1 leads to significantly improved results compared to procedures in which no consideration is taken of the machining force. However, it is computationally very complex and in the case of more complex machining procedures is also not easy to apply.

Further known from US 2008/0 105 094 A1 is for the actual geometry of the machining tool to be changed as a function of the machining force, for example by means of piezoelectric elements arranged inside the machining tool.

The object of the present invention is to create opportunities, by means of which the machining forces occurring during the machining of the workpiece by the machining tool can more easily be taken into consideration.

SUMMARY OF THE INVENTION

The object is achieved by an operating method as set forth hereinafter. Advantageous embodiments of the operating method form the subject matter of dependent claims.

In accordance with the invention, an operating method of the type mentioned in the introduction is designed such that the numerical controller takes the machining force into consideration in that it varies the geometric measurement of the machining tool during the machining dynamically and in real time as a function of the machining force.

The present invention is therefore based on the idea that instead of calculating a new path, it can simply be assumed purely arithmetically that the geometry of the machining tool has changed. The numerical controller is as it were tricked into believing that the geometry of the machining tool has changed. In reality however the geometry of the machining tool has not changed. However, the machining tool has been deflected by the machining force. If—purely arithmetically—the change in the geometry is selected appropriately, the effect of the deflection can thus be compensated for.

The inventive procedure first simplifies the learning cut. It is true that the learning cut has to be performed for each machining tool, just as in DE 10 2017 206 931 A1. However, only a single relationship for the dependence of the geometric measurement on the machining force needs to be determined. In contrast, no determination of such relationships Individually for the position-controlled axes is necessary.

The subsequent operation of the machine tool is also—from the perspective of the numerical controller—considerably easier. This is because only the geometric measurement of the machining tool need be varied. The associated influence on the control commands for the individual position-controlled axes arises automatically, based on the varied geometric measurement of the machining tool.

The actual values that are characteristic of the machining force can be captured metrologically. Alternatively, the actual values can also be determined. Examples are explained below in connection with the preferred embodiments.

The inventive operating method works particularly easily and reliably if the machining tool is designed as a milling cutter, so that the machining of the workpiece by the machining tool is a milling operation. In this case the geometric measurement of the machining tool is a milling cutter radius of the milling cutter, and the numerical controller merely needs to vary the milling cutter radius as a function of the machining force.

In the case of a milling cutter the inventive operating method often only works reliably if the machining of the workpiece is performed synchronously by the milling cutter. However, this can readily be guaranteed. The term "synchronism" has a clearly defined meaning for the person skilled in the art.

The actual values that are characteristic of the machining force can during milling comprise a current value which is applied to a spindle drive of the machine tool that is rotating the milling cutter. The current value can be captured metrologically by means of a current sensor. Alternatively, the current value can also be determined. In particular, in the case of a determination, this can be the setpoint current which is to be applied to the spindle drive. The current value can, where necessary, be preprocessed in a variety of ways. For example, only a torque-generating current can be utilized and/or the current value can be corrected by an offset. The corresponding procedures are known per se from DE 10 2017 206 931 A1.

The inventive operating method is not restricted to milling. Alternatively, the machining tool can also for example be designed as a lathe tool, so that the machining of the workpiece by the machining tool is a lathing operation. In this case the geometric measurement of the machining tool is a length of the lathe tool, and the numerical controller merely needs to vary the length of the lathe tool as a function of the machining force.

The actual values that are characteristic of the machining force can include a current value during the lathing operation, which is applied to the spindle drive of the machine tool that is rotating the workpiece. The current value can be captured metrologically or else determined by means of a current sensor. The above explanations relating to a milling cutter can be applied analogously. This also applies for any necessary preprocessing of the current value.

The inventive operating method can also be employed in other machining operations, for example grinding using a grinding tool.

The numerical controller preferably first determines the geometric measurement as a function of the machining force, then by utilizing the parts program and the determined geometric measurement determines position setpoint values for the position-controlled axes, and finally on the basis of the position setpoint values and of actual position values of the position-controlled axes determines the control signals for the position-controlled axes. This procedure enables the machining force to be taken into consideration particularly easily when determining the control signals.

For the determination of the control signals, the difference between the position setpoint values and the actual position values is relevant. Instead of taking the geometric measurement into consideration when determining the position setpoint values, the geometric measurement could hence alternatively also be taken Into consideration by correcting the actual position values or the difference between position setpoint values and actual position values.

The numerical controller preferably determines a correction value for the geometric measurement as a function of the machining force and determines the geometric measurement by adding a basic geometric measurement, which is known to the numerical control and, is independent of the machining force, and the correction value.

The object is further achieved by a control program as set forth hereinafter. In accordance with the invention, the processing of the control program by the numerical controller causes the numerical controller to execute an inventive operating method.

The object is further achieved by a numerical controller as set forth hereinafter. In accordance with the invention, the numerical controller is programmed with an inventive control program, so that the numerical controller executes an inventive operating method.

The object is further achieved by a machine tool as set forth hereinafter. In accordance with the invention, in a machine tool of the type mentioned in the introduction the numerical controller is designed as an inventive numerical controller.

BRIEF DESCRIPTION OF THE DRAWING

The above-described properties, features and advantages of this invention and the manner in which they are achieved will become more clearly and more readily understood in connection with the following description of the exemplary embodiments, which are explained in greater detail in connection with the drawings. The drawings show, in a schematic representation:

FIG. 1 a first embodiment of a machine tool,
FIG. 2 a second embodiment of a machine tool,
FIG. 3 a flow diagram,
FIG. 4 a characteristic of a machining force,
FIG. 5 a corresponding characteristic of a geometric measurement,
FIG. 6 a deflection of a machining tool,
FIG. 7 a further characteristic of a machining force, and
FIG. 8 a corresponding characteristic of a geometric measurement.

DETAILED DESCRIPTION OF PREFERRED EMBODIMENTS

Figure 1:
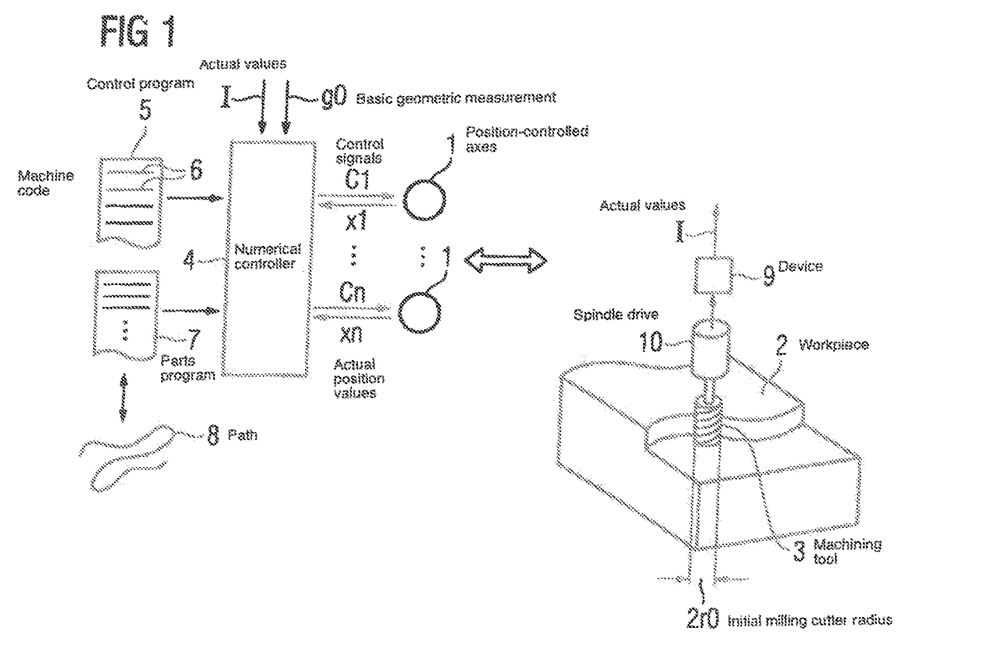
Figure 2:
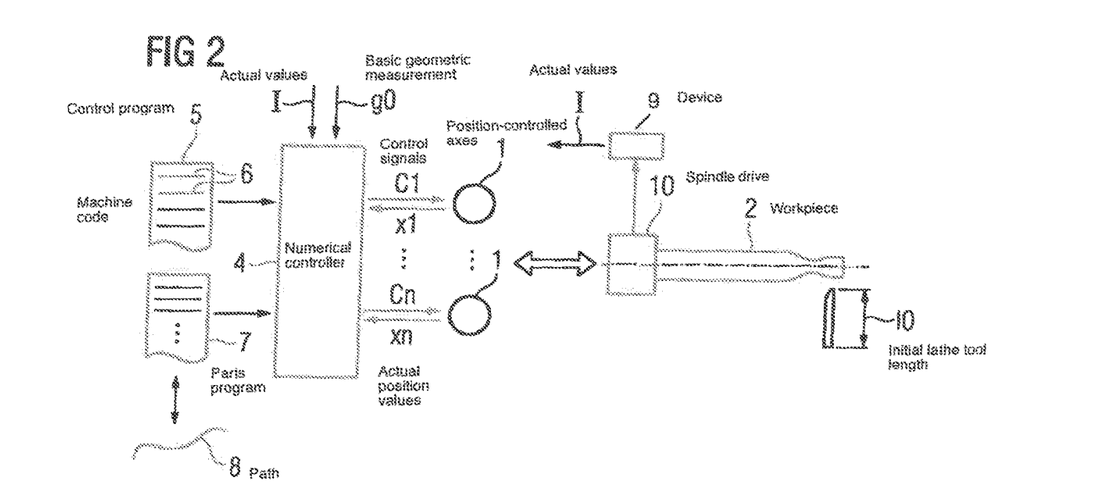

In accordance with FIGS. 1 and 2, a machine tool has a number n of position-controlled axes 1. The number n of position-controlled axes 1 can be determined as required. The minimum number n is 1. However, the number n of position-controlled axes 1 is usually greater than 1. A workpiece 2 is held (clamped) in the machine tool. The workpiece 2 is to be machined in the machine tool in a material-removing manner by means of a machining tool 3 of machine tool.

The machine tool further has a numerical controller 4. The numerical controller 4 is connected to the position-controlled axes 1. The connection of the numerical controller 4 to the position-controlled axes 1 firstly serves to emit control signals $C_i$ (i=1, 2, ..., n) to the position-controlled axes 1. Secondly, the connection of the numerical controller 4 to the position-controlled axes 1 serves to receive actual position values $x_i$ (i=1, 2, ..., n) in each case from the position-controlled axes 1. As a result, the position-controlled axes 1 are thereby controlled by the numerical controller 4. Due to the corresponding control of the position-controlled axes 1, the machining tool 3 is moved by the numerical controller 4 in a position-controlled manner relative to the workpiece 2.

The numerical controller 4 is programmed with a control program 5 (system program). The control program 5 comprises machine code 6, which can be processed by the numerical controller 4. The processing of the machine code 6 by the numerical controller 4 causes the numerical controller 4 to execute an operating method, which is explained in greater detail below in connection with FIG. 3.

Figure 3:
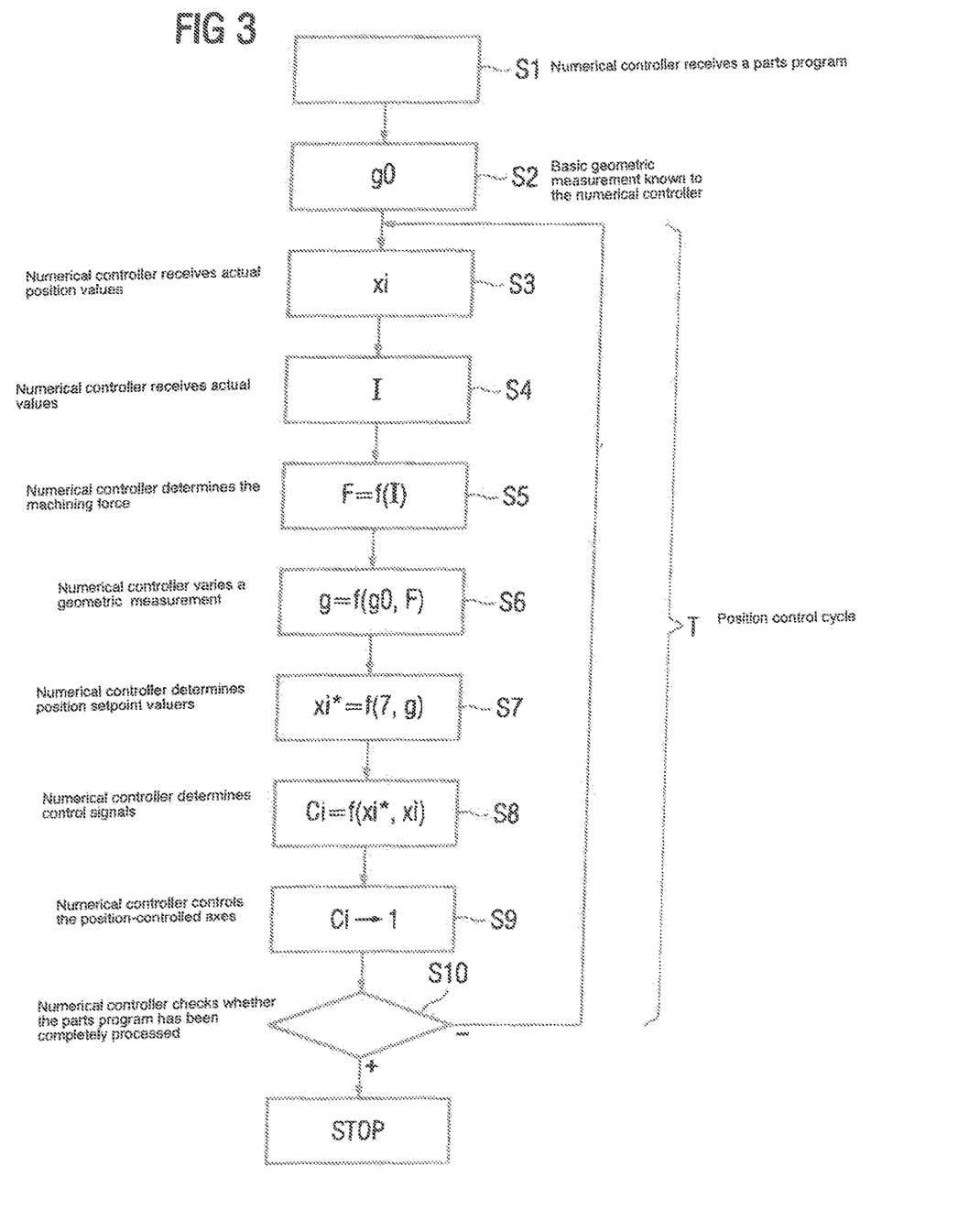

In accordance with FIG. 3 the numerical controller 4 in a step S1 receives a parts program 7 (utility program). According to the schematic representation in FIG. 1 the parts program 7 determines a path 8 along which the workpiece 2 should be machined in a material-removing manner by means of the machining tool 3.

In a step S2 a basic geometric measurement g0 of the machining tool 3 is known to the numerical controller 4. In the case of the embodiment of the machine tool in accordance with FIG. 1, in which the machining tool 3 is designed as a milling cutter and consequently the machining of the workpiece 2 by the machining tool 3 is a milling operation, the basic geometric measurement g0 is an initial milling cutter radius r0 of the milling cutter. During milling the number n of position-controlled axes 1 is usually 3 or more. In the case of the embodiment of the machine tool in accordance with FIG. 2, in which the machining tool 3 is designed as a lathe tool and consequently the machining of the workpiece 2 by the machining tool 3 is a lathing operation, the basic geometric measurement g0 is an initial lathe tool length 10 of the lathe tool. During the lathing operation the number n of position-controlled axes 1 is usually 2 or more.

Steps S1 and S2 need each only be executed if changes occur in this regard, thus if for example the parts program 7 is changed or the machining tool 3 is replaced. In contrast, a step S3 and steps S4 to S10 following step S3 bring about the control of the position-controlled axes 1 required for the machining of the workpiece 2 by the machining tool 3. Steps S3 to S10 are repeatedly executed cyclically by the numerical controller 4 with a position control cycle T. The position control cycle T is usually less than 1 ms, for example 125 μs or 250 μs. The numerical values given are purely by way of example.

In step S3 the numerical controller 4 receives the respective actual position values $x_i$ from the position-controlled axes 1. In step S4 the numerical controller 4 receives a number of actual values I from a device 9 of the machine tool. The numerical controller 4 is—at least for this purpose—connected to the device 9 (see FIGS. 1 and 2). Regardless of the number and type of the actual values I, the actual values I are determined so that they are characteristic of a machining force F exerted by the workpiece 2 on the machining tool 3 while the workpiece 2 is being machined by the machining tool 3. Since step S4 is integrated into the cyclical processing of steps S3 to S10, the receipt of the actual values I takes place during the machining of the workpiece 2 by the machining tool 3 and in real time. The actual values I are either captured metrologically by the device 9 or are determined by it arithmetically. An arithmetic determination can be based on specified and/or on metrologically captured values.

The actual values I can in particular include a current value (setpoint value or actual value) applied to a spindle drive 10 of the machine tool (see FIGS. 1 and 2). In the case of the embodiment of the machine tool in accordance with FIG. 1 (machining tool 3 designed as a milling cutter) the milling cutter is rotated by means of the spindle drive 10. In the case of the embodiment of the machine tool in accordance with FIG. 2 (machining tool 3 designed as a lathe tool) the workpiece 2 is rotated by means of the spindle drive 10.

Figure 4:
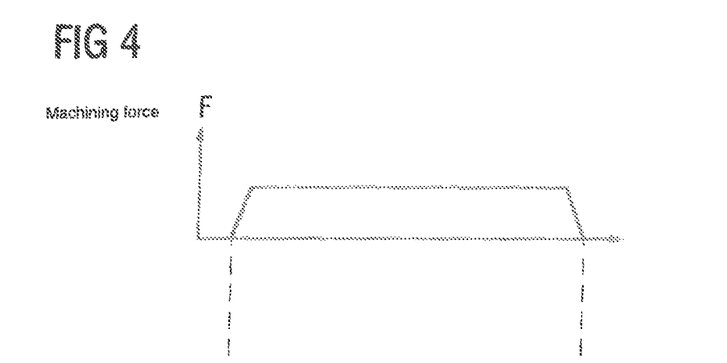
Figure 5:
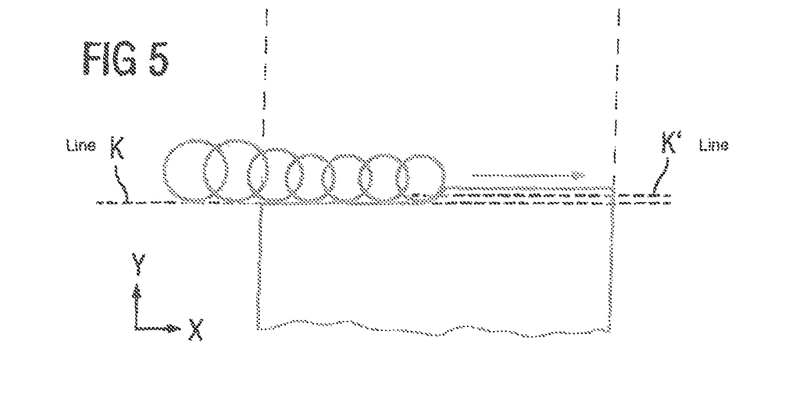
Figure 6:
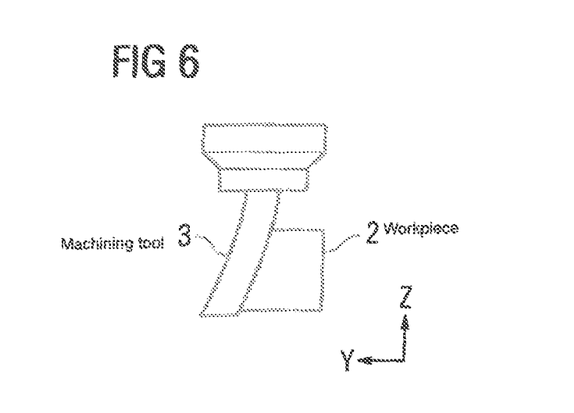

In step S5 the numerical controller 4 determines the machining force F on the basis of the actual values I. In step S6 the numerical controller 4 varies a geometric measurement g of the machining tool 3 as a function of the machining force F. This variation takes place due to the integration of step S6 into the sequence of steps S3 to S10 dynamically and in real time during the machining of the workpiece 2 by the machining tool 3. For example, the numerical controller 4 can in step S6 initially determine a correction value δg and then determine the geometric measurement g by adding the basic geometric measurement g0 and the correction value δg. In the case of the embodiment of the machine tool in accordance with FIG. 1 (machining tool 3 designed as a milling cutter) the milling cutter radius of the milling cutter is thus varied. In the case of the embodiment of the machine tool in accordance with FIG. 2 (machining tool 3 designed as a lathe tool) the lathe tool length of the lathe tool is in contrast varied. FIGS. 4 and 5 show, purely by way of example of a simple case (machining tool 3 designed as a milling cutter, travel movement in the X-direction, orientation of the milling cutter from the base parallel to the Z-direction), the characteristic of the machining force F and of the geometric measurement g, here of the effective milling cutter radius. FIG. 6 further shows schematically and in a considerably exaggerated manner the deflection of the machining tool 3 caused by the machining force F.

The procedure of the present invention is clearly explained below with reference to FIGS. 4 to 6. The explanation is here given in connection with an embodiment of the machining tool 3 as a milling cutter. However, the explanation is—in a correspondingly adapted manner—also applicable if the machining tool 3 is embodied differently.

The milling cutter has a particular geometric measurement g0, for example in the case of a milling cutter the radius r0. If the workpiece 2 is to be machined along the line designated by K in FIG. 5 and the machining tool 3 were infinitely rigid, the axis of rotation of the machining tool 3 would have to be exactly the distance r0 from the line K. Hence in step S2 the basic geometric measurement g0 of the machining tool 3 is made known to the numerical controller 4, so that the numerical controller 4 can correspondingly take into consideration the basic geometric measurement g0—in the case of the milling cutter the radius r0. Such a procedure is standard for every numerical controller 4.

However, due to the machining force F the machining tool 3 is deflected in accordance with the representation in FIG. 6. The radius r0 of the milling cutter or generally the geometric measurement g0 of the machining tool 3 has not changed. Nevertheless, if no further measures were taken, milling would for example take place along a line K' instead of the line K. In order to reach the line K, the distance of the axis of rotation of the machining tool 3 must therefore be reduced. This is inventively achieved in that—once more: purely arithmetically within the numerical controller 4—the milling cutter radius or generally the geometric measurement g of the machining tool 3 is correspondingly adjusted dynamically as a function of the machining force F. As a result, the deflection can be compensated for purely arithmetically. The numerical controller 4 is therefore as it were tricked into believing a dynamically changing "false milling cutter radius" (or generally a dynamically changing false geometric measurement g), so that the precise deflection caused by the machining force F is compensated for. However, the machining tool 3 itself is not changed.

In step S7 the numerical controller 4 determines position setpoint values $xi^*$ (I=1, 2, . . . , n) for the position-controlled axes 1. The determination of the position setpoint values $xi^*$ is done by utilizing the parts program and the geometric measurement g, as determined in step S6. The determination of the position setpoint values $xi^*$ is done—assuming a corresponding control of the position-controlled axes 1—such that the workpiece 2 is machined in a material-removing manner by the machining tool 3 along the path 8 determined by the parts program 7.

In step S8 the numerical controller 4 determines the control signals Ci for the position-controlled axes 1 on the basis of the position setpoint values $xi^*$ and the actual position values xi of the position-controlled axes 1. The control signals Ci can for example be speed setpoint values or current setpoint values or a combination of such setpoint values. In step S9 the numerical controller 4 controls the position-controlled axes 1 according to the determined control signals Cl. As a result, the machining tool 3 is moved correspondingly in a position-controlled manner relative to the workpiece 2.

In step S10 the numerical controller 4 checks whether the parts program 7 has been completely processed. If this is not the case, the numerical controller 4 returns to step S3, wherein in step S7 the position setpoint values $xi^*$ are repeatedly determined afresh in accordance with the progress in processing the parts program 7. Otherwise the procedure in FIG. 3 is completed.

To be able to undertake the inventive dynamic variation of the geometric measurement g, the numerical controller 4 must know the corresponding dependence on the machining force F. This dependence can for example be determined once beforehand and then be stored in the numerical controller 4. However, other procedures are also possible. In the simplest case a purely linear dependence exists, so that the correction value δg is proportional to the machining force F. However, other dependences are also possible.

In summary, the present invention thus relates to the following situation:

A numerical controller 4 of a machine tool receives a parts program 7 which determines a path 8 along which a workpiece 2 should be machined in a material-removing manner by means of a machining tool 3 of the machine tool. For a number of position-controlled axes 1 of the machine tool, by means of which the machining tool 3 is moved in a position-controlled manner relative to the workpiece 1, the numerical controller 4 determines control commands Ci by utilizing the parts program 7 and controls the position-controlled axes 1 according to the determined control commands Ci. The numerical controller 4 determines the control commands Ci in such a way that the workpiece 2 is machined in a material-removing manner by the machining tool 3 along the path 8 determined by the parts program 7. During the machining of the workpiece 2 by the machining tool 3 the numerical controller 4 receives, in real time, actual values I that are characteristic of a machining force F exerted by the workpiece 2 on the machining tool 3 during the machining of the workpiece 2 by the machining tool 3. The numerical controller 4 takes a geometric measurement g of the machining tool 3 and the machining force F into consideration when determining the control commands Ci. The consideration of the machining force F is achieved in that, during the machining, the geometric measurement g of the machining tool 3 is varied dynamically and in real time as a function of the machining force F.

Figure 7:
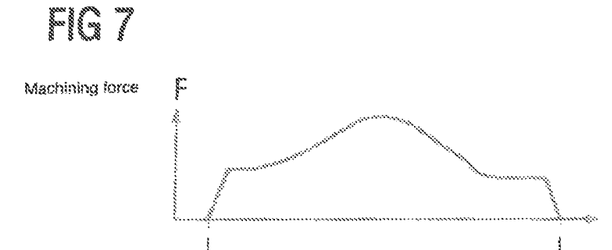
Figure 8:
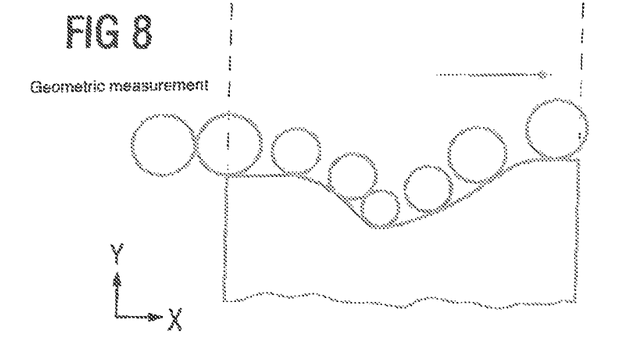

The present invention has many advantages. In particular, the operating procedure can also be easily applied when machining a free contour. This is because there is no need to recalculate the machining force F on the individual position-controlled axes 1. Nor is any interpretation of the direction of force per position-controlled axis 1 necessary. Due to the correction of the geometric measurement g this can be done considerably more easily. FIGS. 7 and 8 show, purely by way of example of an analogous case to FIGS. 4 and 5 (machining tool 3 designed as a milling cutter, orientation of the milling cutter from the base parallel to the Z-direction) for a free contour (movement of the milling cutter both in the X-direction and in the Y-direction), the characteristic of the machining force F and of the geometric measurement g, here of the effective milling cutter radius. The inventive operating method can further be employed for other machining technologies, for example for grinding.

Although the invention has been Illustrated and described in greater detail by the preferred exemplary embodiment, the invention is not restricted by the disclosed examples and other variations can be derived therefrom by the person skilled in the art, without departing from the scope of protection of the invention.

What is claimed is:

1. An operating method for a machine tool, the method comprising:
receiving a parts program with a numerical controller of the machine tool that determines a path along which a workpiece is to be machined to remove material by a machining tool of the machine tool;
moving a plurality of position-controlled axes of the machine tool, by which the machining tool is moved in a position-controlled manner relative to the workpiece;
determining with the numerical controller control commands by utilizing the parts program and controlling the position-controlled axes according to the determined control commands;
determining with the numerical controller the control commands in such a way that the workpiece is machined to remove material by the machining tool along the path according to the parts program;
receiving in real time with the numerical controller during the machining of the workpiece by the machining tool, actual values that are characteristic of a machining force exerted by the workpiece on the machining tool during the machining of the workpiece;
taking into consideration, with the numerical controller, the machining force during the machining of the workpiece, and determining a correction value for a geometric measurement of the machining tool as a function of the machining force;

varying the geometric measurement of the machining tool dynamically, and in real time during the machining of the workpiece, as a function of the machining force without changing the machining tool by adding the correction value to a basic geometric measurement of the machining tool which is an initial measurement of the machining tool and known to the numerical controller and is independent of the machining force to arithmetically compensate for a deflection of the machining tool by the machining force;

determining position setpoint values of the position-controlled axes by utilizing the parts program and the varied geometric measurement of the machining tool;

determining control signals of the position-controlled axes based on a difference between the position setpoint values and actual position values of the position-controlled axes to move the machining tool along the path according to the parts program; and controlling the position-controlled axes with the numerical controller according to the determined control signals.

2. The operating method of claim 1, wherein the machining tool is a milling cutter so that the machining of the workpiece by the machining tool is a milling operation, and the geometric measurement of the machining tool is a milling cutter radius of the milling cutter.

3. The operating method of claim 2, wherein the actual values that are characteristic of the machining force include a current value which is applied to a spindle drive of the machine tool that rotates the milling cutter.

4. The operating method of claim 1, wherein the machining tool is a lathe tool such that the machining of the workpiece by the machining tool is a lathe operation, and such that the geometric measurement of the machining tool is a length of the lathe tool.

5. The operating method of claim 4, wherein the actual values that are characteristic of the machining force include a current value which is applied to a spindle drive of the machine tool that rotates the workpiece.

6. A non-transient computer readable medium comprising a control program for the numerical controller, wherein the control program comprises machine code, processing of which by the numerical controller causes the numerical controller to execute the operating method set forth in claim 1.

7. The numerical controller for the machine tool programmed with a control program, wherein the control program comprises machine code, processing of which by the numerical controller causes the numerical controller to execute the operating method set forth in claim 1.

8. The machine tool comprising:

the numerical controller, from which the parts program is receivable to determine the path along which the workpiece is to be machined to remove material, the numerical controller being programmed with a control program, wherein the control program comprises machine code, processing of which by the numerical controller causes the numerical controller to execute the operating method set forth in claim 1;

the plurality of position-controlled axes for moving the machining tool of the machine tool in the position-controlled manner relative to the workpiece, wherein the numerical controller is connected to the position-controlled axes for specifying the control commands to the position-controlled axes; and a device to capture or determine during the machining of the workpiece by the machining tool the actual values that are the characteristic of the machining force exerted by the workpiece on the machining tool during the machining of the workpiece by the machining tool, wherein the numerical controller is connected to the device for receiving the actual values.

\* \* \* \* \*